(No Model.) 4 Sheets—Sheet 1.
H. H. WING.
PROCESS OF OBTAINING IODINE.
No. 456,183. Patented July 21, 1891.
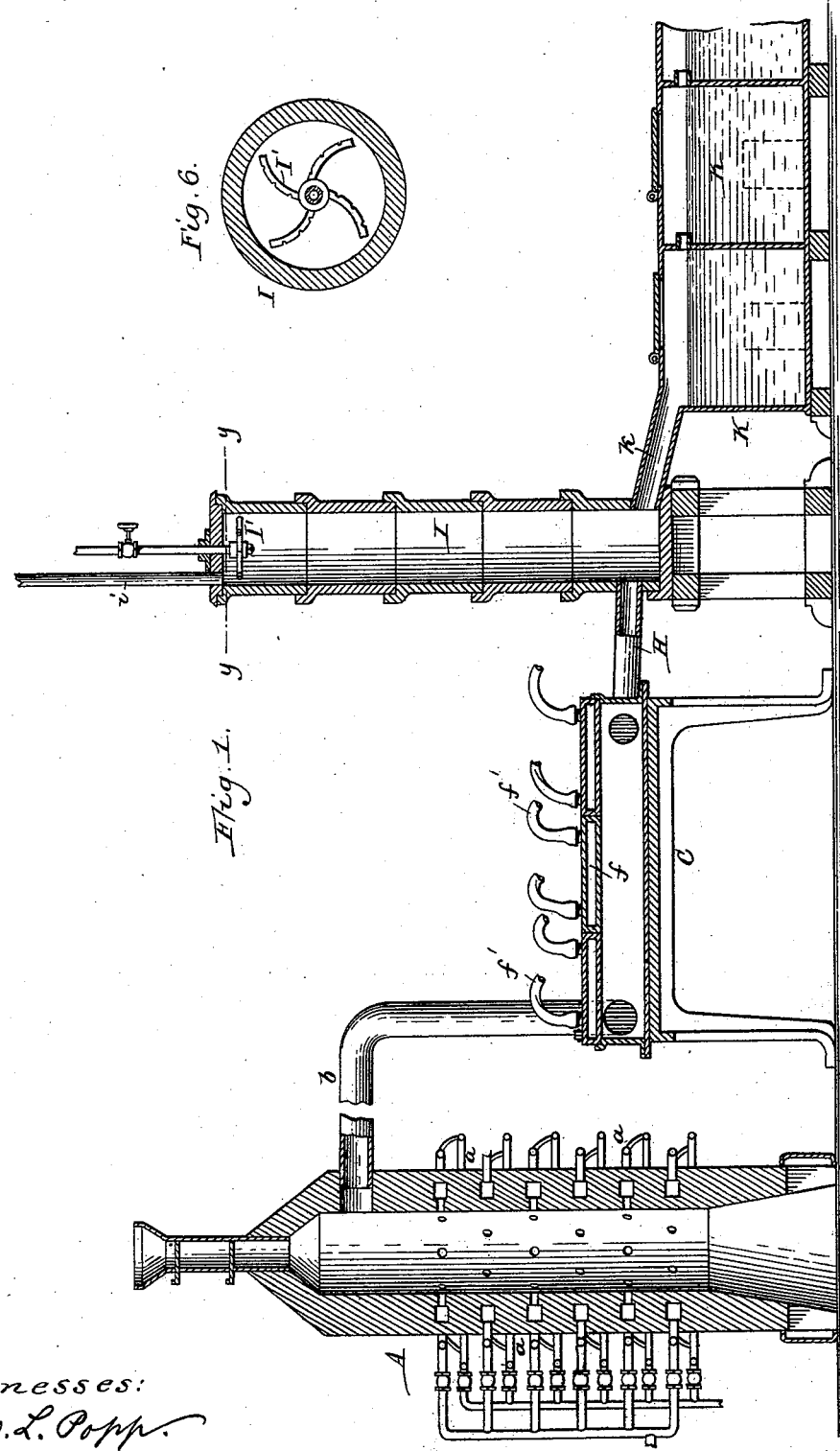

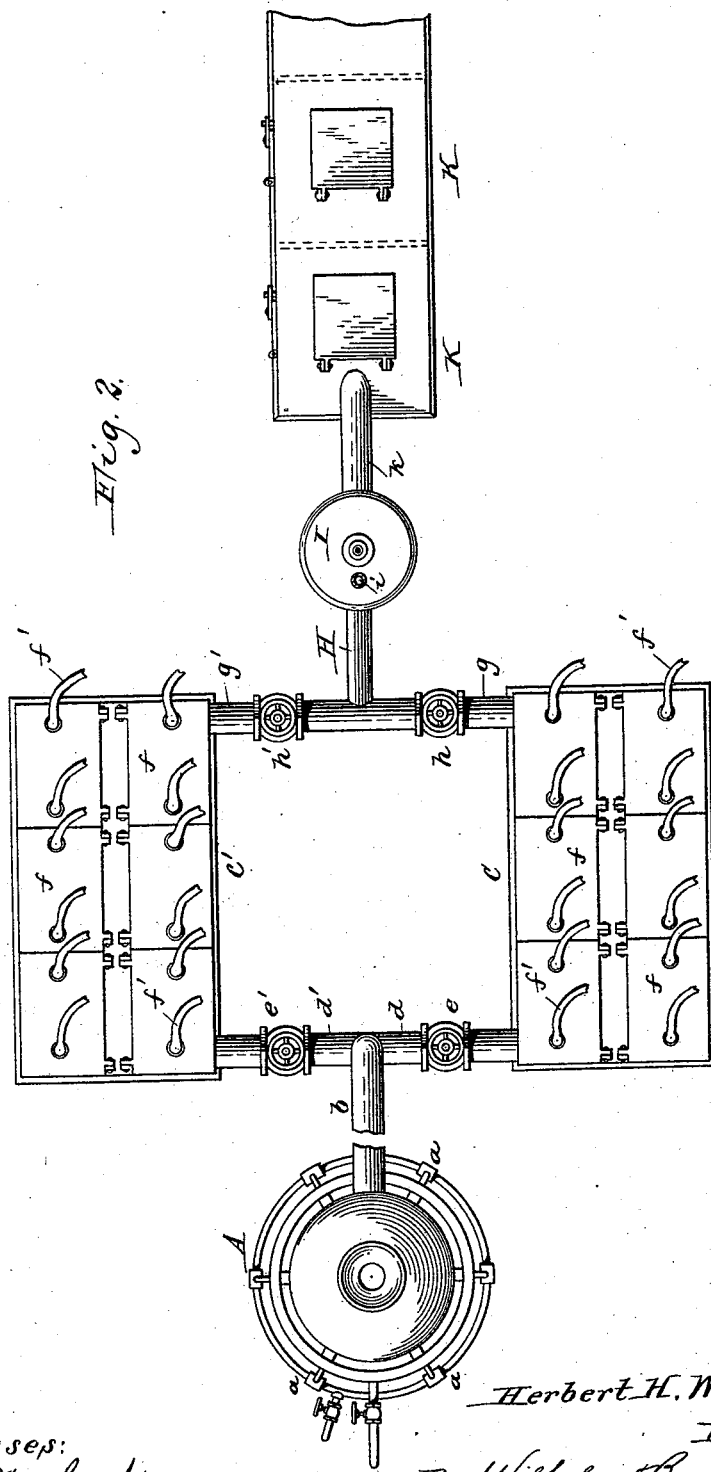

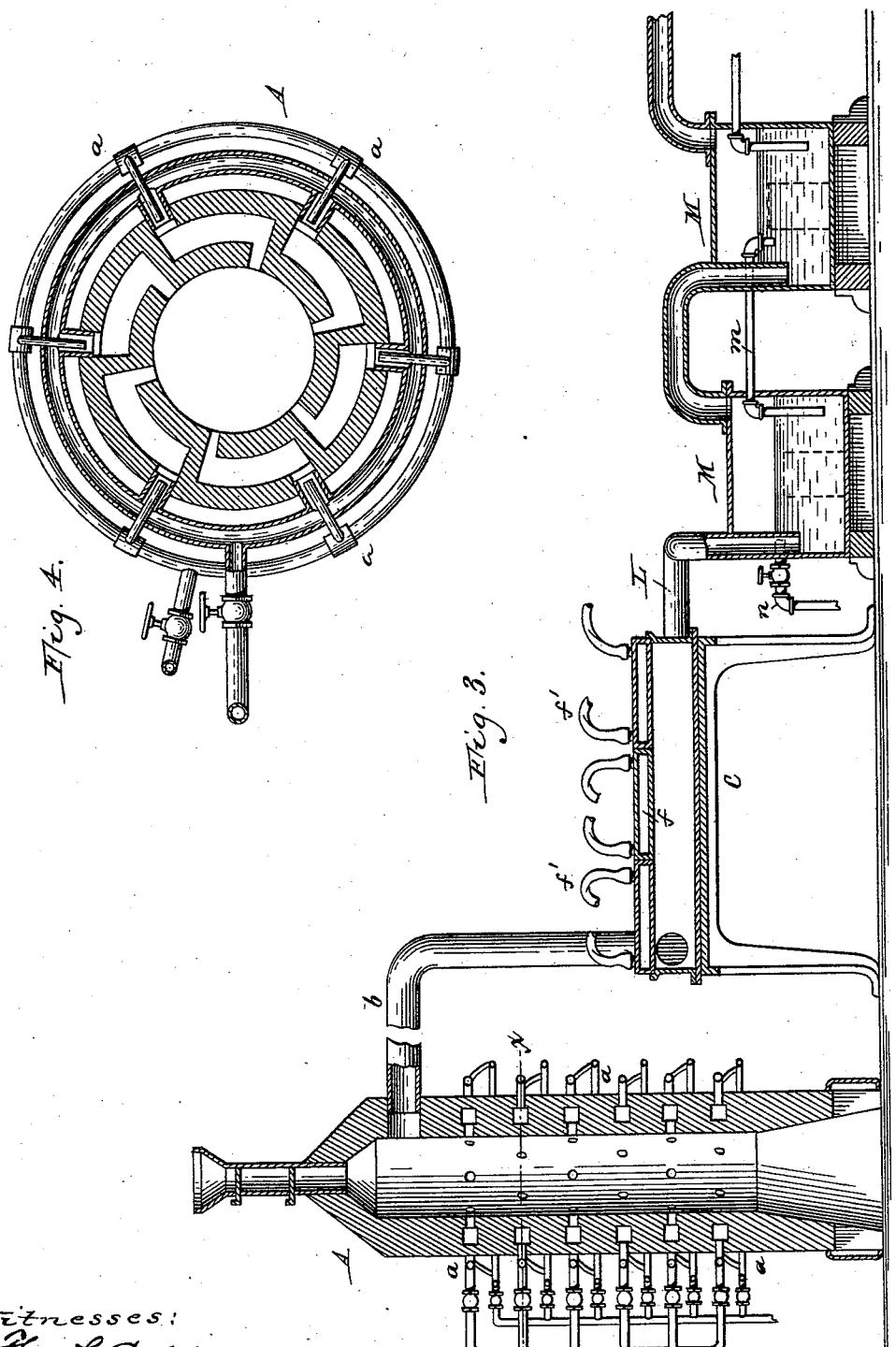

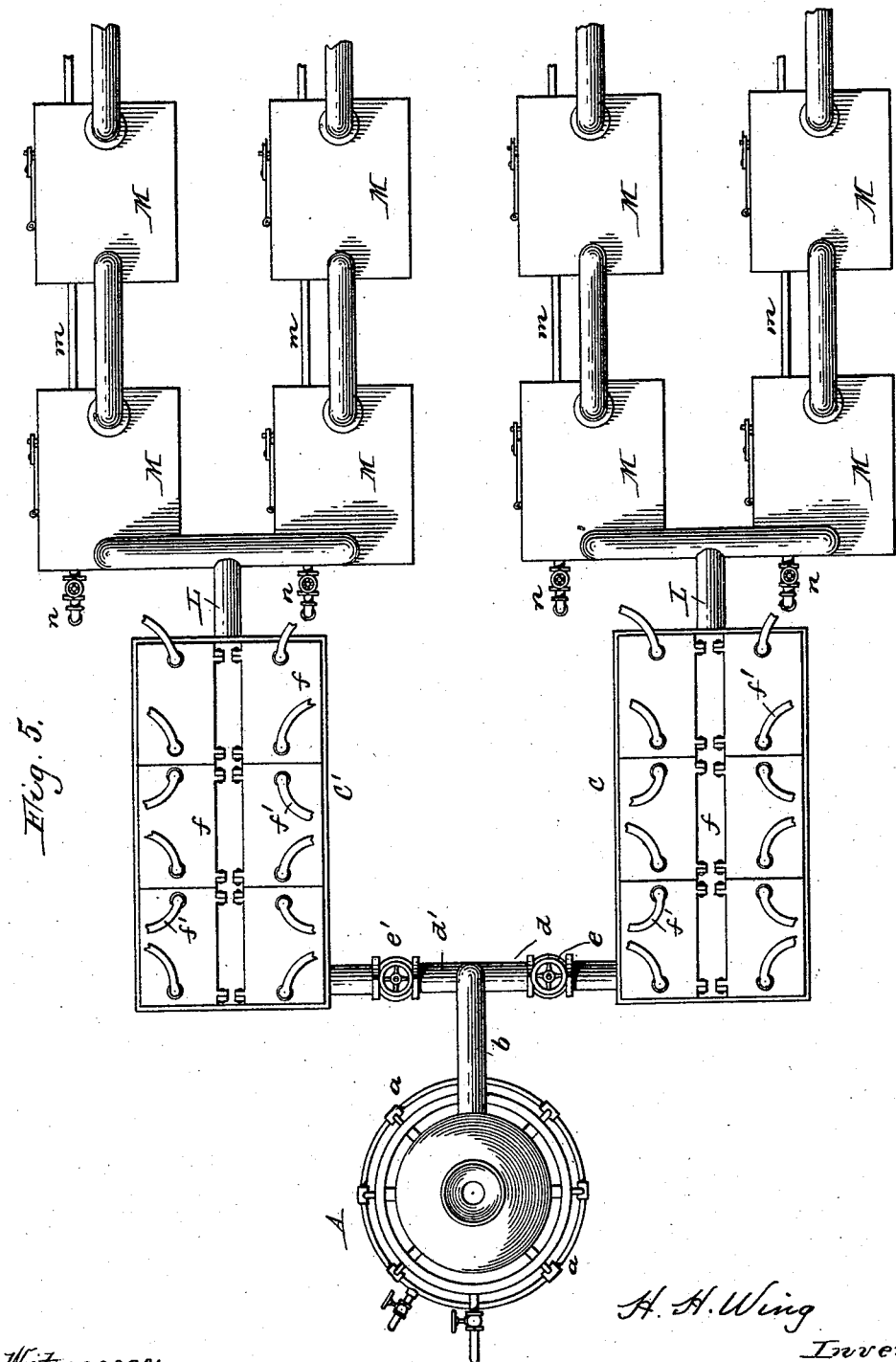

UNITED STATES PATENT OFFICE.

HERBERT H. WING, OF BUFFALO, NEW YORK.

PROCESS OF OBTAINING IODINE.

SPECIFICATION forming part of Letters Patent No. 456,183, dated July 21, 1891.

Application filed November 1, 1890. Serial No. 370,081. (No model.)

*To all whom it may concern:*

Be it known that I, HERBERT H. WING, a citizen of the United States, residing at the city of Buffalo, in the county of Erie and State of New York, have invented a new and useful Improvement in the Method of Manufacturing Iodine, of which the following is a specification.

This invention relates to the manufacture of iodine, and has the object to produce iodine in a simple and inexpensive manner.

In the accompanying drawings, consisting of four sheets, Figure 1 is a sectional elevation of an apparatus by which my invention can be practiced. Fig. 2 is a top plan view thereof. Fig. 3 is a sectional elevation of another construction of apparatus whereby my invention can be practiced. Fig. 4 is a horizontal section of the furnace in line $x$ $x$, Fig. 3, on an enlarged scale. Fig. 5 is a top plan view of the apparatus represented in Fig. 3. Fig. 6 is a horizontal section in line $y$ $y$, Fig. 1, on an enlarged scale.

Like letters of reference refer to like parts in the several figures.

In practicing my invention I use the mother-liquor, called "aqua vieja," obtained from the purification of crude chilisaltpeter, (sodium nitrate.) This mother-liquor contains the iodine, probably in the form of sodium iodate ($NaIO_3$,) with some sodium iodide (NaI.) This mother-liquor is evaporated to a sirupy consistency, and then clay or any other silicious material in a finely-divided state is mixed with it in such proportion as to form a plastic mass, which is molded into balls, preferably two to three inches in diameter. These balls are dried and then calcined in a suitable furnace or kiln to a semi-fused mass, whereby the iodine is expelled. The fumes of iodine are condensed in subliming-chambers, and the uncondensed gases and vapors, consisting largely of the products of combustion, nitrous acid, chlorine gas, and sulphurous and sulphuric acids in varying proportions, according to the composition of the mother-liquor, are passed through a further quantity of mother-liquor. The nitrous acid, sulphurous acid, and chlorine gas in coming in contact with the mother-liquor precipitate the iodine contained in the same, so that a portion of the mother-liquor is deprived of the iodine by calcination with a silicious material, and an additional portion of mother-liquor is deprived of its iodine by treatment with the waste gases resulting from the calcination. This treatment of mother-liquor with the waste gases may be omitted, if desired; but I prefer to employ it, as it materially increases the yield of iodine without materially increasing the expense.

In the apparatus represented in Figs. 1 and 2, A represents the kiln or furnace in which the mixture of silicious material and mother-liquor is calcined, and which is preferably provided with gas-burners $a$ for heating it.

$b$ is the pipe through which the gases and vapors escape from the top of the furnace.

C C' represent two subliming-chambers, in which the iodine is condensed and which are connected with the pipe $b$ by branch pipes $d$ $d'$, provided with cocks $e$ $e'$, so that one of the subliming-chambers can be shut off for removing the deposited iodine while the other subliming-chamber is in use. Each subliming-chamber has its top plate covered with a water-jacket $f$, through which water is circulated by pipes $f'$ and which keeps the top plate cool, so that the iodine contained in the vapor is deposited on the under side of the top plate. The top plate is made in sections, which are hinged to the body of the subliming-chamber for ready access to the same.

$g$ $g'$ represent branch pipes, which are provided with cocks $h$ $h'$, and by which the vapors and gases pass from the subliming-chambers to a main pipe H, which leads to the foot of a tower I. The latter is provided at its top with a sprinkler I', by which mother-liquor is introduced, which is caused to trickle through the tower, while the vapors and gases ascend through the same and finally escape through a waste-pipe $i$ at the top.

The sprinkler may be provided with a number of perforated arms, which are attached to a hub and revolve about the lower end of the supply-pipe, through which the mother-liquor is introduced, as represented in Figs. 1 and 6, or it may be of any other suitable construction. The tower is filled with coke, broken porcelain, or some other suitable material. The iodine is precipitated in the mother-liquor trickling through the tower by the nitrous acid, sulphurous acid, and chlorine gas contained in the vapors and passes with the mother-liquor from the bottom of the tower through a pipe $k$ into settling-tanks K, in which it is deposited and from which it is removed from time to time and further purified.

In the apparatus represented in Figs. 3 and 5 the tower is dispensed with and the waste gases and vapors pass from each subliming-chamber by a pipe L to a series of washing-vessels M, in which the gases and vapors are conducted through mother-liquor, with which the vessels are supplied, in such manner that the mother-liquor enters the washing-vessel farthest from the subliming-chamber and overflows from one vessel into another by pipes $m$ and escapes finally from the washing-vessel nearest the subliming-chamber through an overflow-pipe $n$. The gases and vapors in passing through the mother-liquor precipitate the iodine, which is removed from time to time and further purified.

The semi-fused material produced by the calcination consists of silicate of soda, together with silicates of other bases contained in the silicious material and mother-liquor, and this material may be used for obtaining soda, water glass, and other products.

I claim as my invention—

1. In the manufacture of iodine, the method of producing fumes containing iodine, which consists in mixing silicious material with the mother-liquor resulting from the purification of sodium nitrate and calcining the mixture, substantially as set forth.

2. The herein-described method of producing iodine, which consists in mixing silicious material with the mother-liquor resulting from the purification of sodium nitrate, calcining the mixture, and collecting the sublimed iodine, substantially as set forth.

3. The herein-described method of producing iodine, which consists in mixing silicious material with the mother-liquor resulting from the purification of sodium nitrate, calcining the mixture, conducting the fumes through a chamber in which the sublimed iodine is collected, and bringing the uncondensed vapors in contact with a further quantity of said mother-liquor, whereby a further quantity of iodine is precipitated, substantially as set forth.

Witness my hand this 28th day of October, 1890.

HERBERT H. WING.

Witnesses:
CARL F. GEYER,
ALICE G. CONNELLY.